United States Patent
Marking

(10) Patent No.: US 9,550,405 B2
(45) Date of Patent: Jan. 24, 2017

(54) METHODS AND APPARATUS FOR CONTROLLING A FLUID DAMPER

(71) Applicant: FOX FACTORY, INC., Scotts Valley, CA (US)

(72) Inventor: John Marking, El Cajon, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 0 days.

(21) Appl. No.: 14/590,836

(22) Filed: Jan. 6, 2015

(65) Prior Publication Data

US 2015/0115563 A1    Apr. 30, 2015

Related U.S. Application Data

(63) Continuation of application No. 12/902,239, filed on Oct. 12, 2010, now Pat. No. 8,955,653.

(60) Provisional application No. 61/250,927, filed on Oct. 13, 2009.

(51) Int. Cl.
```
F16F 9/53      (2006.01)
B60G 17/08     (2006.01)
F16F 9/06      (2006.01)
B60G 15/12     (2006.01)
```

(52) U.S. Cl.
CPC .............. B60G 17/08 (2013.01); B60G 15/12 (2013.01); F16F 9/061 (2013.01); F16F 9/066 (2013.01); F16F 9/53 (2013.01)

(58) Field of Classification Search
CPC .......... B60G 17/08; B60G 15/12; F16F 9/061; F16F 9/53; F16F 9/066

USPC .................. 188/266.1, 267.1, 267.2, 322.15
See application file for complete search history.

(56) References Cited

U.S. PATENT DOCUMENTS

| | | | |
|---|---|---|---|
| 2,846,028 A | 8/1958 | Gunther | |
| 4,709,779 A | 12/1987 | Takehara | |
| 4,858,733 A | 8/1989 | Noguchi et al. | |
| 5,248,014 A * | 9/1993 | Ashiba | F16F 9/50 188/282.5 |
| 5,956,951 A * | 9/1999 | O'Callaghan | B60G 17/08 188/267.1 |
| 6,131,709 A * | 10/2000 | Jolly | F16F 9/20 137/909 |
| 6,215,217 B1 * | 4/2001 | Kurosawa | F16C 17/02 310/67 R |
| 6,279,702 B1 | 8/2001 | Koh | |
| 6,371,267 B1 * | 4/2002 | Kao | F16D 13/72 192/113.31 |
| 6,510,929 B1 | 1/2003 | Gordaninejad et al. | |
| 7,243,763 B2 * | 7/2007 | Carlson | B62D 5/006 188/266.1 |
| 7,422,092 B2 | 9/2008 | Hitchcock et al. | |
| 7,770,701 B1 | 8/2010 | Davis | |
| 8,104,591 B2 * | 1/2012 | Barefoot | F16F 9/34 188/267.2 |
| 8,955,653 B2 | 2/2015 | Marking | |
| 2002/0130000 A1 | 9/2002 | Lisenker et al. | |

(Continued)

*Primary Examiner* — Christopher Schwartz

(57) ABSTRACT

A spring for a suspension is described. The spring includes: a spring chamber divided into at least a primary portion and a secondary portion, and a fluid flow path coupled with and between the primary portion and the secondary portion. The fluid flow path includes a bypass mechanism, wherein the bypass mechanism is configured for automatically providing resistance within the fluid flow path in response to a compressed condition of the suspension.

18 Claims, 3 Drawing Sheets

(56) References Cited

U.S. PATENT DOCUMENTS

| | | | | |
|---|---|---|---|---|
| 2002/0130003 A1* | 9/2002 | Lisenker | ................. | F16F 9/535 |
| | | | | 188/267.2 |
| 2007/0034464 A1* | 2/2007 | Barefoot | ................... | F16F 9/34 |
| | | | | 188/322.15 |
| 2007/0119669 A1* | 5/2007 | Anderfaas | ............... | F16F 9/535 |
| | | | | 188/267.2 |
| 2008/0041677 A1* | 2/2008 | Namuduri | .......... | B60G 17/0152 |
| | | | | 188/267.2 |
| 2008/0314706 A1* | 12/2008 | Lun | ........................ | F16F 9/067 |
| | | | | 188/267.2 |
| 2009/0200126 A1* | 8/2009 | Kondo | .................... | F16F 9/535 |
| | | | | 188/267.1 |

\* cited by examiner

METHODS AND APPARATUS FOR CONTROLLING A FLUID DAMPER

CROSS-REFERENCE TO RELATED APPLICATIONS

This application claims priority to and benefit of co-pending U.S. patent application Ser. No. 12/902,239, filed on Oct. 12, 2010, entitled "METHODS AND APPARATUS FOR CONTROLLING A FLUID DAMPER" by Marking et al., which is herein incorporated by reference, and assigned to the assignee of the present application. The U.S. patent application Ser. No. 12/902,239 claims priority to and benefit of U.S. provisional patent application Ser. No. 61/250,927, filed Oct. 13, 2009, entitled "SYSTEM FOR MAGNETIC-RHEOLOGICAL (MR) FLUID", by Marking et al. which is herein incorporated by reference, and assigned to the assignee of the present application.

BACKGROUND OF THE INVENTION

Field of the Invention

The present invention relates to shock absorbers for vehicles. More particularly, the disclosure relates to fluid dampers. More particularly still, the disclosure relates to methods and apparatus for controlling and managing dampening through the selective use of dampening fluid having variable flow characteristics.

Description of Related Art

Magneto rheological fluid (MR fluid) is a variable character fluid comprising a (e.g. colloid like) suspension of micrometer-sized particles in a carrier fluid, often a type of oil. When subjected to a magnetic field, the fluid greatly increases its apparent viscosity and/or shear strength. The particles, which are typically micrometer or nanometer scale spheres or ellipsoids, are active when subjected to a magnetic field (e.g. such as iron particles) and are distributed randomly and in suspension within the carrier liquid under normal circumstances. When a magnetic field is applied to the liquid suspension, however, the particles (usually in the 0.1-10 µm range) align themselves along lines of magnetic flux. When the fluid is contained between two poles (typically of separation 0.5-2 mm), the resulting chains of particles restrict the movement of the fluid, perpendicular to the direction of flux, effectively increasing its viscosity and/or shear strength. The yield stress of the fluid when it is "activated" or in an "on" magnetized state can be controlled very accurately and quickly (typically a few milliseconds) by varying the magnetic field intensity.

There are problems arising from the use of variable viscosity fluids, like MR fluid in mechanical applications. For example, even in the absence of electromagnetic energy, MR fluid is very dense, resulting in much greater viscosity and strength (up to four times) compared to "normal" fluids. Mechanical systems using such fluids may not be capable of handling corresponding dynamic loads.

Another problem with the MR fluid is its abrasiveness. This abrasiveness is caused by the ferrous particles suspended in the oil as they can have a sandpaper effect on all of the moving parts. Mechanical systems employing such fluids may be rapidly worn out.

What is needed is a damper for a suspension system that utilizes variable rheology fluid in a manner that avoids problems associated with use of such fluid.

SUMMARY OF THE INVENTION

The present invention generally includes a fluid damper comprising a first fluid-filled chamber, a second chamber filled with a fluid having variable flow characteristics and at least partially displaceable by the first fluid, and a gas chamber, the gas chamber compressible due to the displacement of the second chamber. In one embodiment, the fluid in the second chamber is a variable rheology fluid.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments of the invention and are therefore not to be considered limiting of its scope, for the invention may admit to other equally effective embodiments.

DETAILED DESCRIPTION

Figure 1:
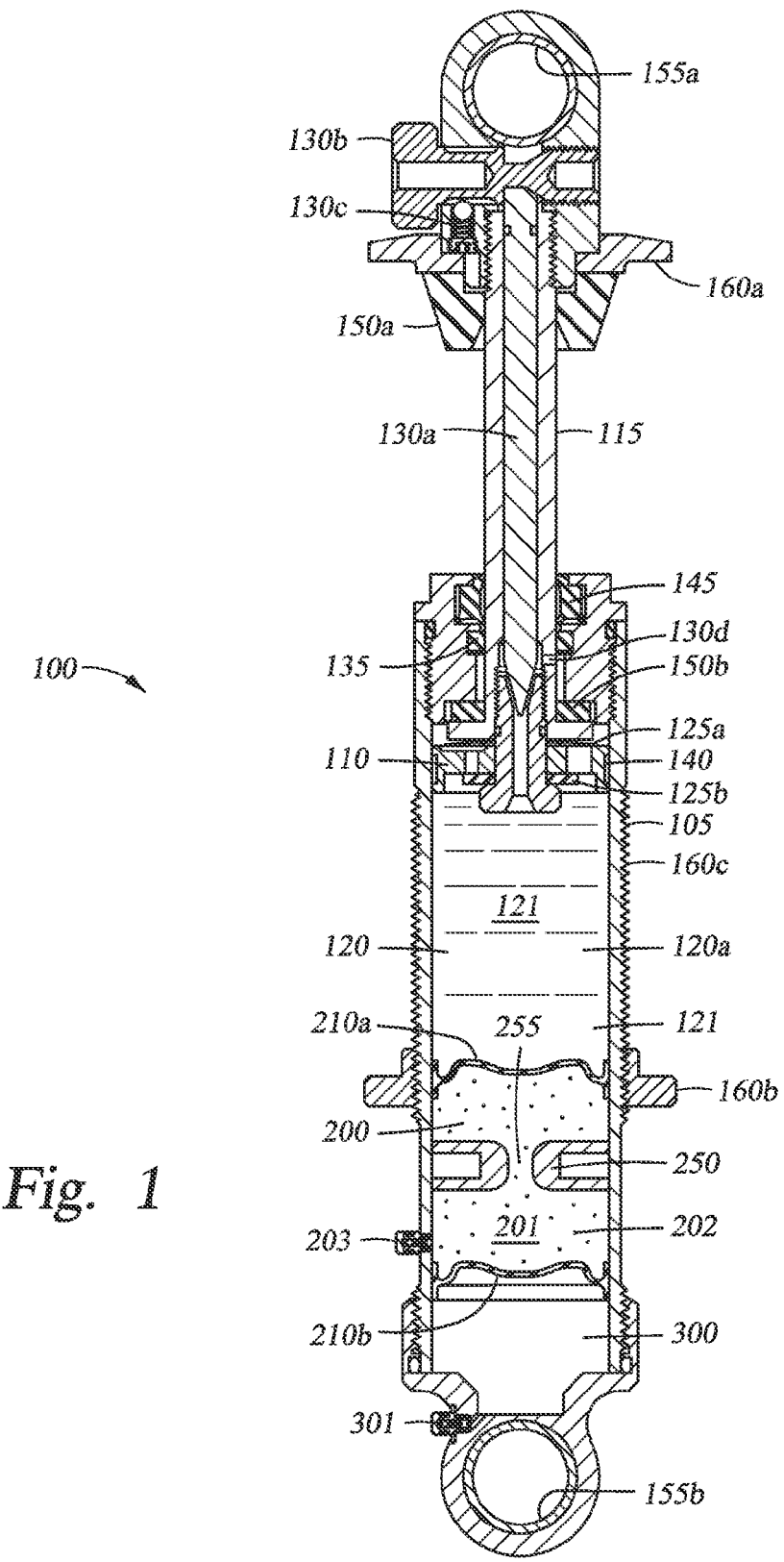
FIG. 1 is a section view of a damper according to one embodiment.
Figure 2:
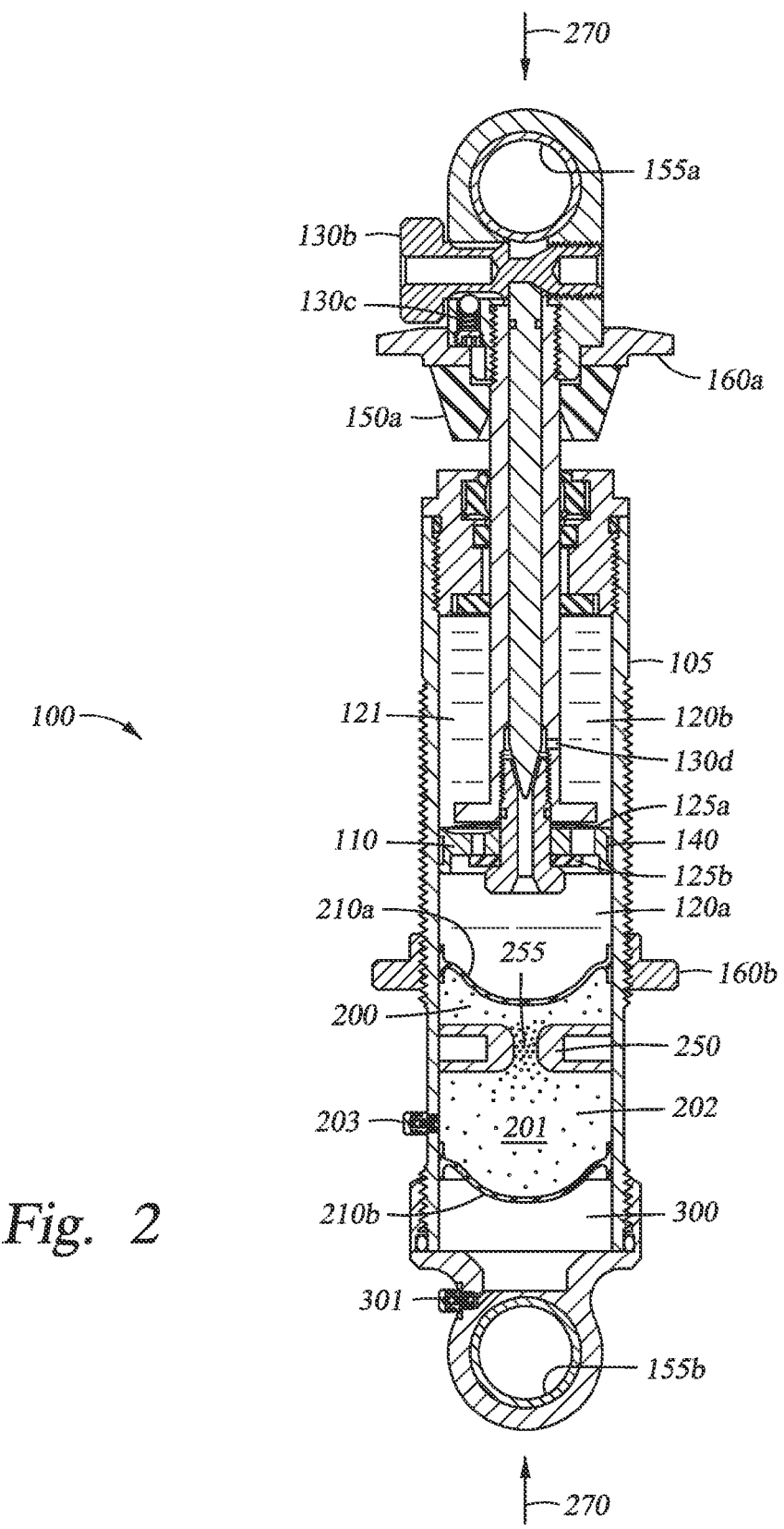
FIG. 2 is a section view of the damper of FIG. 1 with the damper in a compression stroke.

FIG. 1 is a section view of a damper 100. The damper includes a housing 105 as well as a piston 110 and rod 115 for reciprocating within the housing in compression and retraction or "rebound" strokes. The housing includes a first chamber 120 filled with a first fluid 121, and the chamber is dividable into a compression side 120a (shown in FIG. 1) and a rebound side 120b (FIG. 2). The piston 110 is often provided with fluid pathways therethrough including shims 125 a, b which permit fluid to pass between sides 120a, 120b of the first chamber 120 while providing predetermined damping flow resistance. For example, during a compression stroke shims 125a are displaceable to permit fluid to move through the piston in an upwards direction. Similarly, during a rebound stroke, shims 125b permit fluid to flow back into the compression side 120a of the first chamber 120. In addition to shims 125a, fluid metering in a compression stroke is controlled by a valve assembly consisting of an axially adjustable member 130a which permits and restricts fluid flow. Member 130a is adjustable by a user through the manipulation of a knob 130b having a detent mechanism 130c to indicate the axial position of member 130a. The valve assembly is adjustable to permit fluid from the compression side 120a of the chamber to flow to the rebound side 120b through a fluid path 130d. Rebound flow may also flow, in an opposing direction during rebound, through that path.

An outer surface of the rod 115 is sealed and centered relative to an inner surface of the housing 105 with a seal and rod bushing 135, and an outer surface of the piston is sealed with an inner surface of the housing by another seal 140. A wiper seal 145 prevents contamination from entering the housing 105 and bumpers 150a, 150b prevent the piston 110 from bottoming or topping out as it reciprocates in the housing 105. At an upper end of the rod 115, a mounting eye 155a permits the rod to be mounted to another part of the vehicle suspension system (not shown), and another mounting eye 155b at a lower end of the housing permits the housing portion of the damper 100 to be mounted to a vehicle frame.

Figure 3:
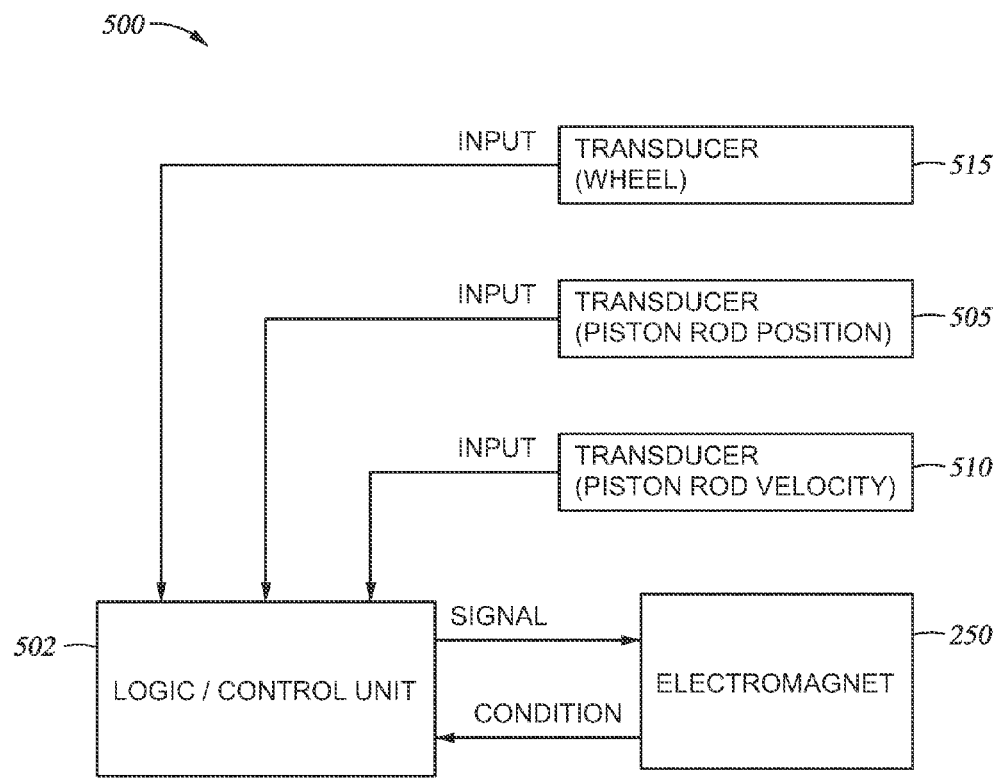
FIG. 3 is a schematic diagram showing one control arrangement for dampers.

In operation, the damper 100 of FIG. 1 works in conjunction with a spring member (not shown). In one embodiment comprising a mechanical spring (not shown) the damper includes a first spring flange 160a mounted on the rod and a second spring flange 160b mounted on the housing where a spring would be situated axially between the two spring flanges. In one embodiment a coil spring (not shown) extends between the first and second spring flange to provide resistance to compressive forces during operation of the damper 100. Threads 160c formed on an outer surface of the housing 105 permit adjustment of spring flange 160b in order to adjust the preload of a coil spring. In one embodiment a damper hereof is used in conjunction with an air spring. Some exemplary air spring configurations are shown in U.S. Pat. No. 6,135,434 ("'434 patent) which patent is entirely incorporated herein by reference. Referring to FIGS. 3, 4, 5 of the '434 patent, the chamber 200, fluid 201 barriers 210 and magnet 250 would be situated within damping chamber 21A in a fashion generally as described herein.

Also included within the damper housing 105 is a second chamber 200 formed adjacent the compression side 120a of the first chamber 120 and fluidically isolated from the first chamber. The second chamber includes a fluid having variable flow characteristics like a variable rheology (e.g. viscosity, shear strength) fluid 201 which, in a present embodiment is an MR fluid. A fill valve 203 permits the fluid 201 to be inserted into the chamber 200. In one embodiment, the fluid 201 comprises particles 202 having magnetic properties as illustrated in the chamber. The chamber 200 is housed between two flexible end walls 210 a, b at a first and second end of the chamber. In one example, the end walls are made of an elastomer-type material which is affixed at an outer perimeter to the inside of the housing wall. In one embodiment each end wall is pre-fabricated with (e.g. bonded to) its own perimeter ring. The rings (having seals about an outer diameter thereof for sealing engagement with an inner diameter of the housing 105) are then installed in an interior of the damper housing and retained in that position by a shoulder member, or snap ring, or suitable axial retainer or combination thereof (not shown). The end walls 210a, b are constructed and arranged to be flexible (and optionally highly elastic) so that portions of the walls are displaceable longitudinally within the housing 105 and each can be displaced to accommodate axial movement of the volume of fluid 201. In this manner, the fluid 201 in the second chamber 200 is displaceable longitudinally within the damper housing 105 depending upon pressures and forces acting within the damper as will be further explained in relation to FIG. 2.

In addition to end walls 210 made of an elastomer material, there are a number of other constructions that could serve a similar purpose. In one example, the end walls are made of a metallic or non-metallic material that in a normal state, includes corrugations or folds (e.g. bellows). When acted upon by pressurized fluid or gas however, the corrugations at least partially straighten out, permitting the walls some flexibility to move the fluid in relation to pressures within the housing 105. Thereafter, the walls return to a somewhat folded shape. In another instance, the second chamber is simply formed between a pair of floating pistons spaced far enough apart to house the fluid volume.

Also disposed within the second chamber 200 is a magnet 250. In one embodiment the magnet 250 is a permanent magnet of a pre-selected strength for providing a desired effect on the fluid 201. In one embodiment the magnet 250 is a "doughnut" shaped magnet. In one embodiment, providing for variable magnetic field (and flux), the magnet 250 comprises an electromagnet. As described herein, electromagnets use electric current to generate a magnetic field which can be turned "on" or "off" or may be modulated to higher or lower flux states as desired. When connected to a DC voltage or current source, the electromagnet becomes energized and creates a magnetic field like a permanent magnet. Electromagnets are often made from relatively soft yet conductive metal winding which quickly dissipates the induced magnetism after the current is switched off. In one embodiment, the electromagnet 250 is doughnut-shaped and forms an orifice 255 at its center which is constructed and arranged to meter the fluid in the second chamber 200 as the fluid is forced from one side of the magnet to the other during compression and rebound strokes respectively. When electric current is supplied to the electromagnet, magnetic flux lines are imposed within the fluid 201 and magnetic particles 202 in the fluid 200 align with such flux lines and become relatively stationary with respect to the magnet. This effect increases the resistance to movement of the fluid in the area of the orifice 255. The magnetic flux density is proportional to the magnitude of the current flowing in the wire of the electromagnet. As such the higher the current that is supplied to the magnet the more resistant to flow will be the fluid 201 because more fluid, further into the center of the orifice will be subjected to the magnetic field thereby "freezing" a greater thickness of particles proximate the orifice.

In order to lessen the abrasive effects of the MR fluid, the magnetic orifice 255 may be coated with an abrasion resistant substance. In one instance, the magnet can be coated with a super hard yet tough material such as for example tungsten carbide with relatively medium to high nickel and/or cobalt content. In another embodiment, the magnet can be coated with medium hard rubber such as Nitrile shore A 70 or 80 (or other elastomer). In one embodiment the magnet can be coated with ceramic or super hard material which in turn is coated with rubber. In one embodiment the orifice may be coated with any suitable combination of hard or compliant abrasion resistant materials. Further the magnet may be surrounded by a fluid retaining barrier to ensure that the magnet is isolated from the fluid and the retaining barrier may in turn be coated for abrasion resistance in any suitable manner. In each of these examples, the material of the magnet is protected from abrasion, fluid invasion and/or corrosion while the coating is chosen to minimize its effect on the magnetic properties of the component (e.g. the coatings and barriers are preferably materials lacking in magnetic properties such as, for example, 300 series stainless steels, noble metals and alloys or polymers or ceramics).

While the embodiment shown includes an electromagnet 250 in the interior of the damper housing 105, the magnet could be annularly arranged on an exterior of the housing and still effect the MR fluid in a way that increases its flow resistance. Electromagnet arrangements external to a damper are disclosed in U.S. Pat. No. 7,422,092 and that patent is incorporated by reference herein in its entirety. In one embodiment a magnet (functionally 250) may be circumferentially intermittent so that is within the housing or without the housing or a combination thereof. In one embodiment a series of magnet are placed axially adjacent the fluid 201 so that various magnets may be activated in series at various points in the stroke of the damper to result in a position dependent damping characteristic.

In one embodiment a gas chamber 300 which is filled with nitrogen to some predetermined pressure is in pressure communication with the second chamber 200. A fill valve 301 permits pressurization of the gas chamber. The purpose of the gas chamber 300 is to act as a compressible reservoir whereby fluid volume from the first 120 chamber can displace a portion of the gas chamber as the piston rod 115 (and its associated volume) moves into the damper housing 105. Additionally, the gas chamber provides a non-linear, spring-like resistance during a compression stroke of a damper due to its pressure acting on an end area of rod 115. In one embodiment the chamber 200 including fluid 201, barriers 210 and magnet 250 are placed between a compression chamber and a reservoir gas charge in place of, for example, intensifier assembly 780 of FIG. 32 of U.S. Pat. No. 7,374,028 ("'028 patent") which patent is entirely incorporated herein by reference. In one embodiment, the chamber 200 and fluid 201 with barriers 210 and magnet 250 are placed in parallel with an intensifier assembly like, for example, intensifier 780 of the '028 patent. In one embodiment, the chamber 200 and fluid 201 with barriers 210 and magnet 250 are placed in series with an intensifier assembly like, for example, intensifier 780 of the '028 patent. While the embodiment shown includes a gas chamber, the compressible portion of the damper could be a mechanical spring disposed, for example in an atmospheric chamber.

FIG. 2 is a section view of the damper 100 of FIG. 1 illustrating the damper during a compression stroke. As illustrated by the arrows 270, the piston and rod are moving into and towards a lower end of the first chamber 120 and the first fluid 121, which in the embodiment of the Figures is a relatively "Newtonian" fluid, is being metered through shims 125a in the piston from a compression 120a to a rebound 120b side of the first chamber 120. Also illustrated in FIG. 2, the second chamber 200 with its flexible end walls 210a, b is being displaced downwardly and in turn, is compressing the gas chamber in order to compensate for a reduction in volume in the housing 105 due to the volume of the piston rod 115 as it enters the housing 105.

In FIG. 2, the second chamber 200 and fluid 201 therein are also being displaced relative to the electromagnet 250 with at least part of the MR fluid in the second chamber 200 having been urged, during compression stroke, through the orifice 255 formed in the center of the electromagnet 250. In FIG. 2, the electromagnet 250 is illustrated in an "on" condition where electric current is being provided to the magnet. As illustrated, particles 202 in the MR fluid have gathered (and "bunched") in the orifice due to the magnetic field generated by the magnet. The effective result is an increased flow resistance of the MR fluid in the area of the orifice 255 and correspondingly increased dampening in the compression stroke of the damper since the orifice (through which the MR fluid must pass as the second chamber 200 is displaced) has effectively been made smaller by the clustered particles 202. It is noteworthy that the same mechanism can be selectively activated, or deactivated, during rebound to achieve a desire rebound damping resistance as the fluid 201 flows back "up" through the orifice. As mentioned herein, the magnetic flux density brought about is proportional to the magnitude of the current flowing in the wire of the electromagnet. In other words the electromagnet controlled orifice, in combination with a magnetically sensitive fluid, can operate as a valve with an infinite number of settings (including fully "open", fully "closed" and all points between) depending on the applied current.

While the gas chamber 300 is shown housed in the main damper housing 105, the gas chamber could be remotely located in a separate housing and the second chamber with the MR fluid could also be disposed in the separate housing with fluid communication between the main and remote housings (for example refer to the '028 patent). In the example of a remote gas chamber, the communication path between the two housings would still permit the second chamber 200 to be displaced, thereby moving the variable viscosity MR fluid relative to the electromagnet 250. Remote gas chambers/reservoirs are shown and described in US patent application no. 2010/0170760 assigned to the owner of the present patent application and that co-pending application is incorporated herein by reference in its entirety.

The damper 100 disclosed herein is intended for use in vehicles, including bicycles and any other type suspended vehicle or motor vehicle. When used with bicycles for example, the electromagnet 250 can be battery powered using power from an existing battery (such as for a head light, for example) or used with its own on-board battery. In one embodiment the magnet could be a permanent magnet and could be mechanically moved closer or further from the fluid 201 and/or orifice to facilitate a greater or lesser magnetic effect. In one embodiment a magnetic field "insulator" (such as for example a shunted conductive sheath or merely a non-conductive spacer) could be selectively interposed between the magnet and the fluid 201/orifice for creating a stronger or lesser magnetic field within the fluid 201 (e.g. proximate the orifice). Permanent magnet embodiments may not require any external power source where manual manipulation may be used to perform the function of moving either the magnet or an insulator or any suitable combination thereof to alter the strength of the magnetic fields within the fluid 201.

An electromagnet's strength is determined by the material in the core; the amount of current in the wire; and the number of turns that the wire makes around the core. Therefore, depending upon the physical characteristics of the magnet, a single AA battery can power the electromagnet disclosed herein. When used with a motor vehicle, the magnet and any control components related to it can easily be powered by the vehicle's battery or alternator (i.e. onboard electrical generation).

While the electromagnet is shown in its "on" position in the compression stroke of FIG. 2, the magnet might be in an "off" position during a rebound stroke when the piston and rod are returning to an upper end of the housing. The magnet's ability to become quickly de-energized once electric current is removed permits its use during one stroke, or a part of one stroke and not the opposite stroke. Such attribute greatly enhances the selectivity which can be applied to the use of the magnetic flow control function. The "on" and "off" conditions are controlled by a switch or potentiometer which can be manually operated or can be automatically operated (e.g. with a microprocessor and solenoids if needed) based upon one or more sensed conditions within the shock absorber or operational conditions of the vehicle.

When used with a motor vehicle, especially an automobile, each wheel of the vehicle can be equipped with a damper 100 having an MR fluid-filled chamber. In these instances, a control system can permit the dampers to work in unison or separately depending upon terrain conditions and how a logic/control unit is programmed. FIG. 3 shows a schematic diagram of a remote control system 500 based upon any or all of vehicle speed, damper rod speed, and damper rod position. In one embodiment, the system is designed to automatically increase dampening in a shock absorber in the event a damper rod reaches a certain velocity in its travel towards, for example, the bottom end of a damper at a predetermined speed of the vehicle. In one embodiment the system adds dampening (and control) in the event of rapid operation (e.g. high rod velocity) of the damper to avoid a bottoming out of the damper rod as well as a loss of control that can accompany rapid compression of a shock absorber with a relative long amount of travel. In one embodiment, the system adds dampening (e.g. orders the magnet to its "on" position) in the event that the rod velocity in compression is relatively low, but the rod progresses past a certain point in the travel. Such configuration aids in stabilizing the vehicle against excessive low rate suspension movement events such as cornering roll, braking and acceleration yaw and pitch and "g-out."

FIG. 3 illustrates, for example, a system including three variables: rod speed, rod position and vehicle speed. Any or all of the variables shown may be considered by logic control unit 502 in controlling the electromagnet 250. Any other suitable vehicle operation variable may be used in addition to or in lieu of the variables 515, 505, 510 such as for example piston rod compression strain, steering wheel position, brake pedal position, accelerator pedal position, eyelet strain, vehicle mounted accelerometer data or any other suitable vehicle or component performance data or combination thereof. In one embodiment, a suitable proximity sensor or linear coil transducer or other electromagnetic transducer is incorporated in the dampening cylinder to provide a sensor to monitor the position and/or speed of the piston (and suitable magnetic tag) with respect to the cylinder. In one embodiment, the magnetic transducer includes a waveguide and a magnet that is joined to the cylinder and oriented such that the magnetic field generated by the magnet passes through the piston rod and the waveguide. Electric pulses are applied to the waveguide from a pulse generator that provides a stream of electric pulses, each of which is also provided to a signal processing circuit for timing purposes. When the electric pulse is applied to the waveguide a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, digital or analog, proportional to the calculated distance and/or velocity. Such a transducer-operated arrangement for measuring rod speed and velocity is described in U.S. Pat. No. 5,952,823 and that patent is incorporated by reference herein in its entirety.

While a transducer assembly located at the damper measures rod speed and location, a separate wheel speed transducer for sensing the rotational speed of a wheel about an axle includes housing fixed to the axle and containing therein, for example, two permanent magnets. In one embodiment the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118, which is incorporated herein by reference in its entirety.

In one embodiment, as illustrated in FIG. 3, a logic unit 502 with user-definable settings receives inputs from the rod speed 510 and location 505 transducers as well as the wheel speed transducer 515. The logic unit is user-programmable and depending on the needs of the operator, the unit records the variables and then if certain criteria are met, the logic circuit sends its own signal to the magnet to either turn "on" or "off". Thereafter, the condition of the electromagnet 250 is relayed back to the logic unit 502.

While the examples herein refer to the electromagnet 250 as being in an "on" or "off" position, it will be understood that the nature of the electromagnet permits it to be energized to an infinite number of positions between "off" and fully "on". For example, a logic control unit 502 can be programmed to energize the magnet 250 to some intermediate level based upon a corresponding level of input from a sensor. These incremental adjustments of energy (and the resulting incremental adjustments to dampening) are fully within the scope of the invention.

As the forgoing illustrates the invention addresses problems associated with using variable rheology fluids in mechanical systems. The second chamber serves to keep the MR fluid close to the electromagnet and reduces the amount of MR fluid necessary for use in the damper while isolating the fluid from the piston, seals and other parts of the damper that may be sensitive to wear and damage from the abrasive particles contained in the MR fluid.

While the foregoing is directed to embodiments of the present invention, other and further embodiments of the invention may be devised without departing from the basic scope thereof, and the scope thereof is determined by the claims that follow.

What I claim is:

1. A fluid damper comprising:
    a first chamber comprising a first end and a second end and defined by a wall coupling the first end with the second end, wherein the wall comprises an inner diameter, and wherein the first chamber is divided into a compression portion having a first fluid therein and a gas-filled compressible portion, the compression portion including a piston and a rod disposed therein and movable in a compression and rebound stroke within the first chamber;
    a second chamber disposed within a portion less than a whole of the first chamber and between the first end and the second end, the second chamber comprising a portion of the wall having the inner diameter of the first chamber, the second chamber having a variable rheology fluid therein and dividing the compression portion and gas-filled compressible portion, wherein the second chamber is at least partially displaceable by and isolated from the first fluid and wherein movement of the second chamber causes a volume change in the gas-filled compressible portion; and
    a magnet disposed adjacent to the second chamber, wherein the magnet is annularly-shaped and an outer surface of the magnet is positioned against an inner surface of the wall, wherein an inner surface of the magnet comprises an orifice, wherein the variable rheology fluid has accessibility to a substantial entirety of the orifice for movement there through, and wherein an increase of a current flowing in a wire of the magnet, and hence an increase in a magnetic field, enables flux lines created by the magnetic field to reach toward a center of the orifice into the variable rheology fluid.

2. The damper of claim 1, wherein the magnet selectively produces a magnetic field within the second chamber to bring about a change in the rheology fluid.

3. The damper of claim 2, wherein a portion of the rheology fluid travels through the orifice when the second chamber is displaced.

4. The damper of claim 1, wherein the second chamber includes flexible end-walls permitting the second chamber to be displaced relative to the magnet and the magnet is an electromagnet.

5. The damper of claim 1, wherein a first wall of the second chamber is adjacent the compression portion and a second, opposite wall of the second chamber is adjacent the gas-filled compressible portion.

6. The damper of claim 1, wherein the rod includes a valve assembly positioned therein that permits and restricts fluid flow in a second fluid pathway.

7. A remotely controllable shock absorber system for a vehicle comprising:
    at least two dampers associated with at least two wheels of the vehicle, each damper of the at least two dampers comprising:
        a first chamber comprising a first end and a second end and defined by a wall coupling the first end with the second end, wherein the wall comprises an inner diameter, and wherein the cylinder is divided into a compression portion and a gas-filled compressible portion, the compression portion including a piston and a rod for movement therein;
    a second chamber disposed within a portion less than a whole of the first chamber and between the first end and the second end, the second chamber comprising a portion of the wall having the inner diameter of the first chamber, the second chamber being fluid-filled with a variable rheology fluid; and
    a remotely actuatable electromagnet adjacent the second chamber for affecting the fluid due to a magnetic field created by the electromagnet, wherein the surfaces of the second chamber through which the magnetic field of the electromagnet extends into the variable rheology fluid is coated with an abrasion resistant material, wherein the remotely actuatable electromagnet is annularly-shaped and an outer surface of the electromagnet is positioned against an inner surface of the wall, wherein an inner surface of the electromagnet defines an orifice, wherein the variable rheology fluid has accessibility to a substantial entirety of the orifice for movement there through, and wherein an increase of a current flowing in a wire of the magnet, and hence an increase in a magnetic field, enables flux lines created by the magnetic field to reach toward a center of the orifice into the variable rheology fluid.

8. The system of claim 7, wherein the second chamber includes flexible end walls permitting the chamber to be displaced relative to the electromagnet.

9. The remotely controllable shock absorber system of claim 7, wherein each damper further includes a switch for selectively producing the magnetic field.

10. The remotely controllable shock absorber system of claim 9, wherein each damper further includes a logic/control unit with at least one input for operating the switch automatically.

11. The remotely controllable shock absorber system of claim 10, wherein the at least one input includes at least one of wheel speed, damper piston velocity, and piston rod position.

12. The remotely controllable shock absorber system of claim 11, wherein the switch is operable to incrementally increase or decrease the magnetic field depending upon the at least one input.

13. A fluid damper comprising:
    a damping fluid cylinder comprising a first end and a second end and defined by a wall coupling the first end with the second end, the damping fluid cylinder further having a first volume corresponding to a first damper position and a second volume corresponding to a second damper position, the damping fluid cylinder including a piston and a rod disposed therein and movable in a compression and rebound stroke within the cylinder, the damping fluid cylinder comprising:
        a gas-filled compressible portion including a compressible volume therein;
        a metering fluid chamber containing a rheology fluid having variable flow characteristics;
        a first movable partition separating the gas-filled compressible portion from the metering fluid chamber;
        a second movable partition separating a compression portion of the damping fluid cylinder from the metering fluid chamber; and
        an energy source disposed adjacent to the metering fluid chamber wherein the rheology fluid exhibits a first flow characteristic corresponding to a first energy source output and a second flow characteristic corresponding to a second energy source output, wherein the energy source is a magnet disposed between the first movable partition and the second movable partition, wherein the magnet is annularly-shaped and an outer surface of the energy source is positioned against an inner surface of the wall, wherein an inner surface of the energy source comprises an orifice, wherein the variable rheology fluid has accessibility to a substantial entirety of the orifice for movement there through, and wherein an increase of a current flowing in a wire of the magnet, and hence an increase in a magnetic field, enables flux lines created by the magnetic field to reach toward a center of the orifice into the variable rheology fluid.

14. The fluid damper of claim 13, wherein the variable rheology fluid comprises an MR fluid and the gas-filled compressible chamber is filled with a pressurized gas.

15. The fluid damper of claim 14, wherein a damping fluid in the cylinder exerts a first pressure on the gas-filled compressible portion with the fluid damper in the first position and a second pressure on the gas-filled compressible portion with the damper in the second position and where the first and second pressures are exerted via the second movable partition, the rheology fluid, and the movable partition.

16. The fluid damper of claim 13, wherein a greater portion of the rheology fluid is on a first side of the orifice in the first damper position and less of the rheology fluid is on the first side of the orifice in the second damper position.

17. The fluid damper of claim 13, wherein the energy source acts primarily on rheology fluid proximate the orifice.

18. The fluid damper of claim 13, wherein the orifice is coated with an abrasion resistant material.

* * * * *